(12) United States Patent
Gruszecki et al.

(10) Patent No.: US 9,460,153 B2
(45) Date of Patent: Oct. 4, 2016

(54) METHOD AND SYSTEM FOR ESTIMATING THE SIZE OF A JOINED TABLE

(71) Applicant: INTERNATIONAL BUSINESS MACHINES CORPORATION, Armonk, NY (US)

(72) Inventors: Artur M. Gruszecki, Crakow (PL); Tomasz Kazalski, Crakow (PL); Grzegorz S. Milka, Crakow (PL); Konrad K. Skibski, Crakow (PL); Tomasz Stradomski, Crakow (PL)

(73) Assignee: International Business Machines Corporation, Armonk, NY (US)

(*) Notice: Subject to any disclaimer, the term of this patent is extended or adjusted under 35 U.S.C. 154(b) by 172 days.

(21) Appl. No.: 14/053,056

(22) Filed: Oct. 14, 2013

(65) Prior Publication Data
US 2014/0149388 A1    May 29, 2014

(30) Foreign Application Priority Data
Nov. 26, 2012 (GB) .................................. 1221234.6

(51) Int. Cl.
*G06F 17/30* (2006.01)
(52) U.S. Cl.
CPC ................. *G06F 17/30469* (2013.01)
(58) Field of Classification Search
CPC ................. G06F 17/30498; G06F 17/30466; G06F 17/30469
See application file for complete search history.

(56) References Cited

U.S. PATENT DOCUMENTS

| | | | |
|---|---|---|---|
| 5,761,653 A | 6/1998 | Schiefer | |
| 5,864,842 A | 1/1999 | Pederson | |
| 6,092,062 A | 7/2000 | Lohman | |
| 6,263,334 B1 | 7/2001 | Fayyad et al. | |
| 6,272,487 B1 | 8/2001 | Beavin et al. | |
| 6,865,567 B1 * | 3/2005 | Oommen | G06F 17/30463 |
| 7,299,226 B2 | 11/2007 | Bruno et al. | |
| 7,478,083 B2 | 1/2009 | Corvinelli et al. | |
| 7,512,574 B2 | 3/2009 | Haas et al. | |
| 7,636,707 B2 | 12/2009 | Chaudhuri et al. | |
| 7,685,098 B2 | 3/2010 | Przywara | |
| 7,707,005 B2 | 4/2010 | Fraser et al. | |
| 7,877,374 B2 | 1/2011 | Zabback et al. | |
| 7,917,502 B2 | 3/2011 | Cheng et al. | |
| 7,937,385 B2 | 5/2011 | Bestgen et al. | |

(Continued)

OTHER PUBLICATIONS

GB Patent Application No. 1221783.2—UK IPO Search Report Mailed May 24, 2013.

(Continued)

*Primary Examiner* — Leslie Wong
(74) *Attorney, Agent, or Firm* — Law Office of Jim Boice

(57) ABSTRACT

A method, system, and/or computer program product estimate a cardinality of a joined table (T) obtained by joining at least a first data column (R) and a second data column (S), where R and S each comprise attribute values. A first density distribution function f(x) describes a frequency of the attribute values of R. A second density distribution function (g(x)) describes the frequency of the attribute values of S. A first information on values in R is based on a sample of values of R. A second information on values in S is based on a sample of values of S. One or more processors then estimate a cardinality of a joined table (T) based on the first and second density distribution function (f(x), g(x)) and the first and second information on values.

20 Claims, 2 Drawing Sheets

(56) References Cited

U.S. PATENT DOCUMENTS

| | | | |
|---|---|---|---|
| 7,941,424 B2 | 5/2011 | Xu et al. | |
| 7,984,024 B2 | 7/2011 | Bossman et al. | |
| 8,078,610 B2 | 12/2011 | Molini | |
| 8,190,598 B2 | 5/2012 | Al-Omari et al. | |
| 8,549,004 B2* | 10/2013 | Lakshminarayan | G06F 17/30469 |
| | | | 707/737 |
| 8,775,441 B2 | 7/2014 | Anderson | |
| 2003/0135485 A1 | 7/2003 | Leslie | |
| 2004/0236722 A1 | 11/2004 | Waas et al. | |
| 2004/0260675 A1* | 12/2004 | Bruno | G06F 17/30333 |
| 2006/0085592 A1* | 4/2006 | Ganguly | G06F 17/30498 |
| | | | 711/114 |
| 2006/0218123 A1 | 9/2006 | Chowdhuri | |
| 2008/0306903 A1* | 12/2008 | Larson | G06F 17/30536 |
| 2009/0024568 A1 | 1/2009 | Al-Omari et al. | |
| 2009/0248617 A1 | 10/2009 | Molini | |
| 2010/0049722 A1 | 2/2010 | Xu et al. | |
| 2011/0022581 A1 | 1/2011 | Korlapati | |
| 2011/0055201 A1 | 3/2011 | Burger | |
| 2011/0093499 A1 | 4/2011 | Zhou et al. | |
| 2011/0137890 A1 | 6/2011 | Bestgen et al. | |
| 2011/0213766 A1 | 9/2011 | Hong | |
| 2011/0252020 A1 | 10/2011 | Lim et al. | |
| 2012/0084287 A1* | 4/2012 | Lakshminarayan | G06F 17/30536 |
| | | | 707/737 |
| 2012/0117055 A1 | 5/2012 | Al-Omari et al. | |
| 2012/0117056 A1 | 5/2012 | Al-Omari et al. | |
| 2012/0197868 A1 | 8/2012 | Fauser | |
| 2013/0166557 A1 | 6/2013 | Fricke et al. | |
| 2013/0198165 A1 | 8/2013 | Cheng | |
| 2014/0156635 A1* | 6/2014 | Grochowski | G06F 17/30466 |
| | | | 707/714 |

OTHER PUBLICATIONS

Chen et al., "Scheduling and Processor Allocation for Parallel Execution of Multi-Join Queries", Proceedings of the 8th International Conference on Data Engineering, IEEE Computer Society, Washington DC, USA, Feb. 1992, pp. 58-67.

P. Furtado, "A Survey on Parallel and Distributed Data Warehouses", International Journal of Data Warehousing and Mining, IGI Publishing, vol. 5, No. 2, Apr.-Jun. 2009, pp. 148-169.

N. Bruno, "Automatic Management of Statistics on Query Expressions in Relational Databases", Ph.D. Thesis Proposal, Dept. of Computer Science, Columbia University, New York, NY, Apr. 25, 2002, pp. 1-36.

Xu et al., "Handling Data Skew in Parallel Joins in Shared-Nothing Systems", SIGMOD'08, Proceedings of, ACM, Jun. 2008, pp. 1043-1052.

D. Gunopulos et al., "Approximating Multi-Dimensional Aggregate Range Queries Over Real Attributes", Proceedings of the International Conference on Management of Data, ACM, 2000, pp. 463-474.

D. Fuchs, "Compressed Histograms With Arbitrary Bucket Layouts for Selectivity Estimation", Information Sciences, vol. 177, Issue 3, Feb. 2007, pp. 1-26.

F. Yan et al. "Selectivity Estimation Using Orthogonal Series", Database Systems for Advanced Application, 2003, Proceedings, Eighth International Conference on, Mar. 2003, pp. 157-164.

F. Yan et al., "Selectivity Estimation of Range Queries Based on Data Density Approximation Via Cosine Series", Data and Knowledge Engineering Journal, vol. 63, Issue 3, December 2007, pp. 855-878 (Abstract Only).

S. Chaudhuri et al., "Robust Cardinality and Cost Estimation for Skyline Operator", Proceedings of the 22nd International Conference on Data Engineering, 2006, pp. 1-10.

Jampani et al., "The Monte Carlo Database System: Stochastic Analysis Close to the Data", Transactions on Database Systems, ACM, vol. 36, Issue 3, Aug. 2011, Article 18, pp. 18:1-18:41.

F. Korn et al., "Range Selectivity Estimation for Continuous Attributes", Eleventh International Conference on Scientific and Statistical Database Management, Aug. 1999, pp. 1-10.

B. Oommen et al., "Query Result Size Estimation Using a Novel Histogram-Like Technique: The Rectangular Attribute Cardinality Map", Database Engineering and Applications, International Symposium Proceedings, Aug. 1999, pp. 1-13.

Y. Wu et al., "Spatial Distance Join Query Estimation Without Data Access", IEEE, International Conference on Computer Science and Automation Engineering, vol. 2, 2011, pp. 228-232.

A. Konig, "Query Estimation Techniques in Database Systems", Dissertation, University of Saarlandes, Dec. 2001, pp. 1-100.

U. Srivastava et al., "Isomer: Consistent Histogram Construction Using Query Feedback", Proceedings of the 22nd International Conference on Data Engineering, Apr. 2006, pp. 1-12.

GB Patent Application No. 1221234.6—Examination Opinion Mailed Apr. 17, 2013.

U.S. Appl. No. 14/076,598 Non-Final Office Action Mailed Sep. 30, 2015.

U.S. Appl. No. 14/076,598 Final Office Action Mailed Jun. 13, 2016.

* cited by examiner

US 9,460,153 B2

METHOD AND SYSTEM FOR ESTIMATING THE SIZE OF A JOINED TABLE

This application is based on and claims the benefit of priority from the United Kingdom (GB) Patent Application 1221234.6, filed on Nov. 26, 2012, and herein incorporated by reference in its entirety.

BACKGROUND

The present invention relates generally to the field of database systems. More specifically, the present invention is related to a method and system for estimating the size of a joined table.

Relational databases systems allow a database user to enter queries into the database and return the data that meets the conditions of the query. The data present within the database system is in one or more tables or relations. Each relation consists of a number of records or tuples containing specific information possibly grouped in some ordered sequence. Each tuple consists of one or more fields called attributes. In any single attribute of a tuple there can be only a single value. However, each tuple can have a different value for the same attribute.

Some characteristics of a database relation are typically maintained. For example, the database system may maintain the cardinality, the density and the number of distinct values of each relation. Cardinality is the number of tuples or records in a table, especially the number of rows of a table. The number of distinct values is the number of distinct values of a given attribute or set of attributes. The density is the average number of tuples per distinct value.

One operation performed by a database system is known as a join operation. A join operation is used to combine related tuples from two relations into single tuples. Typically, the join operation matches tuples from two relations on the values taken from each relation on a common attribute and creates a joined table or relation. If another relation needs to be joined with the result relation, the result relation may be referred to as an intermediate relation because it is created in the process of generating a result relation.

A query entered into a relational database system may result in multiple operations being performed. In many cases, the operations of the query can be performed in several different orders without changing the result of the query. Each possible order of operations is referred to as a query execution plan. There may be several alternative query execution plans, each specifying a set of operations to be executed by the database system. Each different query execution plan will have a different resource usage, i.e. processing time, memory usage etc.

Relational database systems typically include a component called a query optimizer. The query optimizer may identify several query execution plans, estimate the cost of each different query execution plan, and select the plan with the lowest estimated resource usage for execution. Query plans generated for a query will differ in their resource usage of obtaining the desired data. The query optimizer evaluates these resource usage estimates for each query plan in order to determine which plan is likely to have the lowest resource usage.

The join operation can be quite expensive, since joining together two or more entire relations can result in a very large relation. When multiple joins are present in a query, the resource usage of a bad execution plan may increase dramatically. It is important for the query optimizer to identify a query execution plan that minimizes resource usage. The join ordering chosen by the query optimizer is often a key factor in the ultimate resource usage of the query execution plan.

Therefore, it would be advantageous to have a mechanism for estimation the cardinality of the joined table in an accurate way to enable the query optimizer to select a query execution plan which is optimal in view of resource usage.

SUMMARY

A method, system, and/or computer program product estimate a cardinality of a joined table (T) obtained by joining at least a first data column (R) and a second data column (S), where R and S each comprise attribute values. A first density distribution function f(x) describes a frequency of the attribute values of the first data column (R). A second density distribution function (g(x)) describes the frequency of the attribute values of the second data column (S). A first information on values in the first data column (R) is based on a sample of values of the first data column (R). A second information on values in the second data column (S) is based on a sample of values of the second data column (S). One or more processors then estimate a cardinality of a joined table (T) based on the first and second density distribution function (f(x), g(x)) and the first and second information on values.

BRIEF DESCRIPTION OF THE SEVERAL VIEWS OF THE DRAWINGS

In the following, illustrative embodiments of the invention will be described in greater detail by way of example, only making reference to the drawings in which.

DETAILED DESCRIPTION

Figure 1:
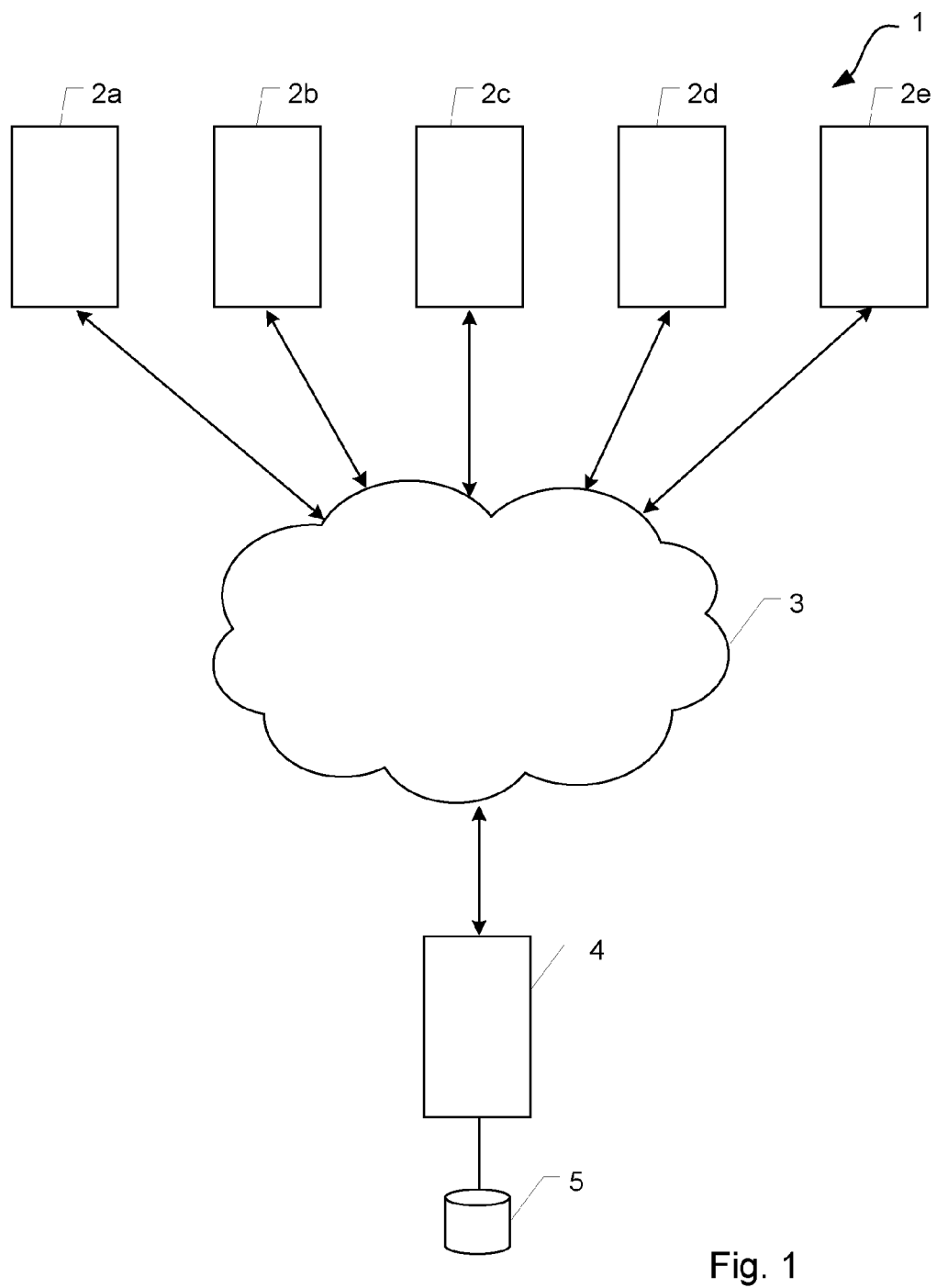
FIG. 1 shows a database system based on a client-server environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodies therein, for example, in baseband or as part of a carrier wave. Such a propagated signal may take any of a variety of forms, including, but not limited to, electromagnetic, optical, or any other suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented program language such as Java, Smalltalk, C++ or the like and conventional procedural programming languages, such as the "C" programming language or similar programming languages. The program code may execute entirely on the user's computer, partly on the user's computer or entirely on the remote computer or server. In the latter scenario, the remote computer may be connected to the user's computer through any type of network, including local area network (LAN) or a wide area network (WAN), or the connection may be made to an external computer (for example, through the Internet using an Internet Service Provider).

Referring to FIG. 1, a conventional architecture of a client-server environment 1 for sending requests to a database 5 is illustrated. A plurality of clients 2a-2e is connected to the network 3. In addition, a server 4 which acts as a database client is connected to the network 3 as well. The network 3, which may be composed from several sub-networks, enables the clients 2a to 2e and server 4 to communicate with each other. For example, the client 2a sends a request to the server 4 over the network 3 for accessing the database 5. The server 4 may receive multiple requests from multiple clients and typically processes them in the order of receipt, or in other cases, according to a predefined prioritization policy. Requests queued in the server 4 wait their turn to be processed by the server 4. Once processed by the server 4, the response to the request is sent to the client 2a-2e.

A request entered into the relational database system may result in multiple operations being performed. Especially multiple join operations can be performed in several different orders without changing the result of the query, but the execution order may affect the query performance in a tremendous way. Therefore relational database systems typically comprise a component for optimizing multiple join operations, called query optimizer (10), i.e. to determine a proper order of the join operations which leads to a minimum of execution time.

One of the most important information for choosing proper order is to estimate the number of rows of the resulting table after the JOIN-operation, hereinafter also referred to as joined table.

In the following, the first table comprising at least a first data column is represented by R and the second table comprising at least a second data column is represented by S. The joined table which is the result of the JON-Operation based on R and S is denoted by T.

The number of rows of the joined table is basically affected by the number of rows of the data columns R, S and the spread of data within the tables, i.e. the number or frequency of distinct values within the data columns R, S.

According to one embodiment of the present invention, the number of rows of the joined table is estimated based on density distribution functions $f(x)$, $g(x)$, wherein the first density distribution functions $f(x)$ is representing the spread of data within the first data column R and the second density distribution functions $g(x)$ is representing the spread of data within the second data column S. According to the invention the density distribution functions $f(x)$, $g(x)$ are integrable functions on the whole domain of possible values. Assuming the density function $f(x)$ has been already defined, obtaining the exact number of rows of the correlated table R meeting a certain criteria, e.g. $x_{min} < x < x_{max}$ can be calculated by integrating $f(x)$:

$$\int_{X_{min}}^{X_{max}} f(x) dx; \qquad \text{(formula 1)}$$

Approximated density distribution functions $f(x)$, $g(x)$ can be derived by using a query feedback algorithm. At the beginning it is assumed that the data are evenly spread across all values between $x_{min}$ and $x_{max}$. So, at the beginning $f(x)$ is represented by a constant value, which can be calculated by:

$$f(x) = \frac{\text{total number of rows in the table}}{|x_{max} - x_{min}|} = const.; \qquad \text{(formula 2)}$$

After execution of a query based on the table R, i.e. select ... from R where attribute<value1 (value1∈[$x_{min}$;$x_{max}$]), an information about the exact number of rows k contained within the range x<value1 can be deduced. So, the density distribution functions $f(x)$ is evaluated by resolving the following equation (assuming the linear independence of the sub-equations):

$$\begin{cases} \int_{X_{min}}^{X_{max}} f(x) dx = \text{total number of rows in the table} \\ \int_{X_{min}}^{value1} f(x) dx = k \end{cases} \qquad \text{(formula 3)}$$

Using the query feedback algorithm, each time a new query is executed, a new condition is added to the equation defining the density distribution. In a generalized way, the formula can be written as:

$$\begin{cases} \int_{x_0^0}^{x_1^0} f(x) = k_0 \\ \int_{x_0^1}^{x_1^1} f(x) = k_1 \qquad ; M \in N \\ \quad \ldots \\ \int_{x_0^{M-1}}^{x_1^{M-1}} f(x) = k_{M-1} \end{cases} \qquad \text{(formula 4)}$$

In other words, by usage of the query feedback algorithm, single values of the exact density distribution function f(x) are determined. The feedback of those values is used to gather and—preferably—improve the density distribution function f(x). To derive a integrable function needed for calculating the number of rows (cf. formula 1), the exact density distribution function f(x) is approximated by a polynomial with order (M−1) using M derived values. The polynomial may have the following structure:

$$f(x) = a_0 + a_1 x + a_2 x^2 + \ldots + a_{M-1} x^{M-1} \qquad \text{(formula 5)}$$

A person skilled in the art is able to obtain the polynomial based on the set of values M derived by using the upper mentioned query feedback algorithm.

The density distribution function g(x) of the second data column S is determined in the same manner by using query feedback algorithm. As a result, the number of rows of the columns R, S containing a certain range of numerical values can be estimated by integrating the respective density distribution function f(x), g(x) within the respective range.

A second aspect which influences the number of rows of a joined table T is the number of unique values $u_1$, $u_2$ within the first and second data column R, S to be joined. The number of rows of the first and second data column R, S can be estimated by using a sample of data, by determining the number of unique values $u_1$, $u_2$ within the sample of data and by extrapolating the number of unique values within the whole column by using the information gathered for the sample, i.e. for the subset of data. Preferably, the data are sampled during the query execution, i.e. the information is gathered just-in-time during query execution.

Figure 2:
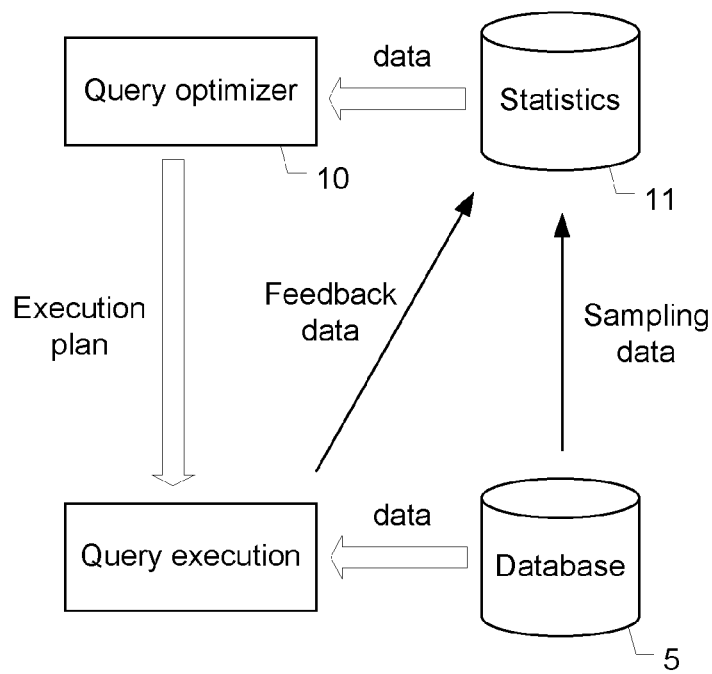
FIG. 2 shows a schematic diagram of data flow within the database system.

FIG. 2 shows a schematic flow chart depicting the data flow within the database system. A statistics unit (11) is storing statistical information. Those statistical information can be derived by sampling the data or by using query feedback. For example, statistical information comprise the number of unique values obtained by sampling the data or information about the exact number of rows k obtained by using query feedback algorithm. The statistical information can be provided to the query optimizer 10, which preferably gathers an execution plan based on statistical information. The execution plan preferably defines the order of cascaded join-operations to optimize the query performance. The way of deriving information about the best order of cascaded join-operations by using statistical information is described in the following disclosure. Finally, the query is executed based on the execution plan provided by the query optimizer 10.

Figure 3:
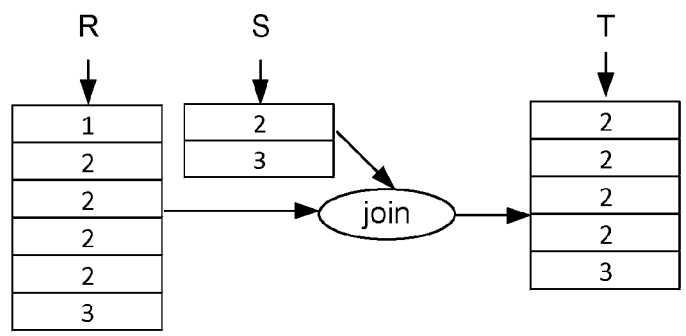
FIG. 3 shows an example of inner-join-operation.

FIG. 3 shows an example for joining first and second data column R, S by the most commonly used inner-join-operation. The resulting joined table T is also shown. To estimate the number of rows of the joined table by using an inner-join-operation, i.e. the resulting joined table T contains all values, which are contained in both tables to be joined, the following equation can be used:

$$F(a,b) = \qquad \text{(formula 6)}$$
$$\sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) *$$
$$\max(u_1^i, u_2^i)$$

wherein $x_0 = a$;
$x_n = b$;
$x_i \in [a,b]$;
f(x): density distribution function of the first data column R;
g(x): density distribution function of the second data column S;
a, b: starting row and end row of the respective columns which are incorporated into the join.
$u_1^i$: number of unique values of the first data column R in the respective interval i;
$u_2^i$: number of unique values of the second data column S in the respective interval i;
F(a,b): estimated number of rows of the resulting joined table T by joining first and second data column R, S in the interval [a,b].

The first term $$\frac{\max\left(\int_{x_i}^{x_{i+1}} f(x)dx, 0\right)}{u_1^i}$$

within formula 6 represents the average number of rows per unique value in the $[x_i; x_{i+1}]$-section for the first data column R, the second term $$\frac{\max\left(\int_{x_i}^{x_{i+1}} g(x)dx, 0\right)}{u_2^i}$$

within formula 6 represents the average number of rows per unique value in the $[x_i; x_{i+1}]$-section for the second data column S. The third term $\max(u_1^i, u_2^i)$ is for deriving the maximum value of the numbers of unique values contained in the $[x_i; x_{i+1}]$-sequences of the first and second data column.

Formula 6 can be simplified in the following way:

$$F(a,b) = \qquad \text{(Formula 7)}$$
$$\sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) *$$
$$\max(u_1^i, u_2^i) =$$
$$\sum_{i=0}^{n-1} \left( \max\left(\int_{x_i}^{x_{i+1}} f(x)dx, 0\right) * \max\left(\int_{x_i}^{x_{i+1}} g(x)dx, 0\right) \right) *$$
$$\frac{\max(u_1^i, u_2^i)}{u_1^i * u_2^i} =$$

-continued $$\sum_{i=0}^{n-1} \frac{\max\left(\int_{x_i}^{x_{i+1}} f(x)dx, 0\right) * \max\left(\int_{x_i}^{x_{i+1}} g(x)dx, 0\right)}{\min(u_1^i, u_2^i)};$$

According to formulas 6 and 7, the interval between the starting row a and the end row b is sub-divided in n sections or segments, wherein n is a natural number N. Preferably the sections are chosen according to the roots of the first and second density distribution function f(x), g(x), i.e. the set of $x_i$ contains at least all roots of the first and second density distribution function f(x), g(x). To adjust the accuracy of the result of the estimation of number of rows of the joined table T, i.e. to adjust the accuracy of the join estimation to the required level, the number of sections n can be adapted. For achieving a high accuracy, the number of sections n is increased. In contrary, in cases where a join estimation with a lower accuracy is acceptable, the number of sections n can be decreased.

The number of sections n can also be determined in a more sophisticated way. The differential of the density distribution function can be used to determine the stiffness of the density distribution function. Preferably the following equation is used to determine the beginning of the next section:

$$x_i = x_{i-1} + \frac{c}{|f'(x_{i-1})|} \quad \text{(Formula 8)}$$

wherein $x_i$=starting value of next section;
$x_{i-1}$=starting value of actual section;
c=constant over the hole domain [a, b];
f'(x)=differential of the density distribution function f(x).

The main advantage of using the stiffness of the density distribution function to determine the section grid is that regions with a high stiffness of density function are correlated with smaller sections and regions with a lower stiffness are represented by major sections.

Figure 4:
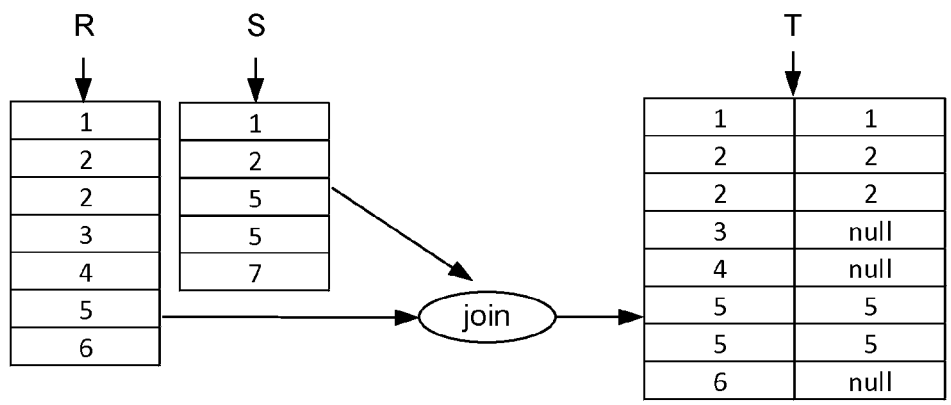
FIG. 4 shows an example of left-outer-join-operation.

The invention also covers other commonly used types of joins, namely left-outer-join, right-outer-join and cross join. Referring to FIG. 4, an example for joining first and second data column R, S by left-outer-join-operation is shown. For example, in left-outer-join-operation, consider intervals in which second data column S does not have rows. In other words, if there is a row with value A in first data column R, and there is no such row in second data column S, resulting joined table T will contain this row with "nulls" in the columns taken from second data column S.

To estimate the number of rows of the joined table T by using a left-outer-join-operation, the following equation can be used:

$$F(a, b) = \quad \text{(formula 9)}$$

$$\sum_{i=0}^{n-1} \left(\frac{\max\left(\int_{x_i}^{x_{i+1}} f(x)dx, 0\right)}{u_1^i} * \frac{\max\left(\int_{x_i}^{x_{i+1}} g(x)dx, 1\right)}{u_2^i}\right) *$$

$$\max(u_1^i, u_2^i)$$

The difference between formula 9 (left-outer-join-operation case) and formula 6 (inner-join-operation case) is the value "1" instead of value "0" in the second maximum function. That is, there are cases where there are no rows in the second table in the respective sequence $[x_i; x_{i+1}]$. In those cases all rows from first data column R with null on the right side should be included into resulting joined table T (cf. FIG. 4).

Formula 9 can be simplified in the following way:

$$F(a, b) = \quad \text{(formula 10)}$$

$$\sum_{i=0}^{n-1} \left(\frac{\max\left(\int_{x_i}^{x_{i+1}} f(x)dx, 0\right)}{u_1^i} * \frac{\max\left(\int_{x_i}^{x_{i+1}} g(x)dx, 1\right)}{u_2^i}\right) *$$

$$\max(u_1^i, u_2^i) =$$

$$\sum_{i=0}^{n-1} \left(\max\left(\int_{x_i}^{x_{i+1}} f(x)dx, 0\right) * \max\left(\int_{x_i}^{x_{i+1}} g(x)dx, 1\right)\right) *$$

$$\frac{\max(u_1^i, u_2^i)}{u_1^i * u_2^i} =$$

$$\sum_{i=0}^{n-1} \frac{\left(\max\left(\int_{x_i}^{x_{i+1}} f(x)dx, 0\right) * \max\left(\int_{x_i}^{x_{i+1}} g(x)dx, 1\right)\right)}{\min(u_1^i, u_2^i)} \approx$$

$$\sum_{i=0}^{n-1} \max\left(\int_{x_i}^{x_{i+1}} f(x)dx, 0\right) * \max\left(\frac{\int_{x_i}^{x_{i+1}} g(x)dx}{\min(u_1^i, u_2^i)}, 1\right)$$

The case of right-outer-join operation is similar to the left-outer-join operation in the way that one considers intervals in which first data column R does not have rows. In other words, if there is a row with value A in second data column S, and there is no such row in first data column R, resulting joined table T will contain this row with "nulls" in the columns taken from the first data column R.

To estimate the number of rows of the joined table T by using an right-outer-join-operation, the following equation can be used:

$$F(a, b) = \quad \text{(formula 11)}$$

$$\sum_{i=0}^{n-1} \left(\frac{\max\left(\int_{x_i}^{x_{i+1}} f(x)dx, 1\right)}{u_1^i} * \frac{\max\left(\int_{x_i}^{x_{i+1}} g(x)dx, 0\right)}{u_2^i}\right) *$$

$$\max(u_1^i, u_2^i) =$$

$$\sum_{i=0}^{n-1} \left(\max\left(\int_{x_i}^{x_{i+1}} f(x)dx, 1\right) * \max\left(\int_{x_i}^{x_{i+1}} g(x)dx, 0\right)\right) *$$

$$\frac{\max(u_1^i, u_2^i)}{u_1^i * u_2^i} =$$

$$\sum_{i=0}^{n-1} \frac{\max\left(\int_{x_i}^{x_{i+1}} f(x)dx, 1\right) * \max\left(\int_{x_i}^{x_{i+1}} g(x)dx, 0\right)}{\min(u_1^i, u_2^i)} \approx$$

$$\sum_{i=0}^{n-1} \max\left(\frac{\int_{x_i}^{x_{i+1}} f(x)dx}{\min(u_1^i, u_2^i)}, 1\right) * \max\left(\int_{x_i}^{x_{i+1}} g(x)dx, 0\right)$$

Comparing formula 11 with formula 10, formula 11 is the reversed image of formula 10.

Also cross-join-operations can be estimated by using the concept according to the invention. By using the cross-join-operation, all rows of the first data column R will be joined with all rows of the second data column S. Cross-join-operation returns the Cartesian product of rows from columns in the join. In other words, it will produce rows which combine each row from the first data column R with each row from the second data column S. Therefore, the number of rows of the cross joined table T can be estimated using the following equation:

$$F(a, b) = \sum_{i=0}^{n-1} \max\left(\int_{x_i}^{x_{i+1}} f(x)\,dx, 0\right) * \sum_{i=0}^{m-1} \max\left(\int_{y_i}^{y_{i+1}} g(x)\,dx, 0\right)$$ (formula 12)

wherein $x_0 = y_0 = a$;
$x_n = y_m = b$;
$x_i, y_i \in [a,b]$;

Note that in formulas 6, 7, 9, 10 and 11, the number of unique value $u_i, u_2 \ne 0$.

In a second embodiment of the invention, the number of rows of the joined table T is also determined based on statistical information derived out of samples of the first and second data columns R, S, but the samples are used for calculating the exact number of rows of a sample-joined table, which is the result of joining both samples and extrapolating the derived result to the whole section or domain.

To estimate the number of rows of the joined table T according to the second embodiment of the invention, the following equation can be used:

$$F(a, b) = \sum_{i=0}^{n-1} F(S_1^i, S_2^i) * \left( \frac{\int_{x_i}^{x_{i+1}} f(x)\,dx}{|s_1^i|} * \frac{\int_{x_i}^{x_{i+1}} g(x)\,dx}{|s_2^i|} \right)$$ (formula 13)

wherein $x_0 = a$;
$x_n = b$;
$x_i \in [a,b]$;
f(x): density distribution function of the first data column R;
g(x): density distribution function of the second data column S;
a, b: starting row and end row of the respective columns which are incorporated into the join;
$S_1^i$: samples randomly chosen from section $[x_i; x_{i+1}]$ from the first data columns R;
$S_2^i$: samples randomly chosen from section $[x_i; x_{i+1}]$ from the second data columns S;
$F(S_1^i, S_2^i)$: exact number of rows by applying a join-operation on the samples $S_1^i$ and $S_2^i$;
$|S_1^i|, |S_2^i|$: number of values within the samples;
F(a,b): estimated number of rows of the resulting joined table by joining first and second data column R, S in the interval [a,b].

The first term within $F(S_1^i, S_2^i)$ within formula 13 represents the exact calculation of number of rows of the joined table based on samples of data, the second term $$\frac{\int_{x_i}^{x_{i+1}} f(x)\,dx}{|s_1^i|}$$

represents a factor expressing how many times the set of data contained in the section $[x_i; x_{i+1}]$ of the first data column R is bigger than the sample of data of the first data column R and the third term $$\frac{\int_{x_i}^{x_{i+1}} g(x)\,dx}{|s_2^i|}$$

represents a factor expressing how many times the set of data contained in the section $[x_i; x_{i+1}]$ of the second data column S is bigger than the sample of data of the second data column S.

One advantage of the second embodiment is that it can be used for all kinds of join-operations. It is only required to calculate the join of the sample data based on the respective join-operation to be estimated.

Thus, as described herein, it is an objective of embodiments of the invention to provide for an improved computer-implemented method, computer-readable medium and computer system for estimating the cardinality of a joined table. The objective is solved by the features of the independent claims. Illustrative embodiments are given in the dependent claims. If not explicitly indicated otherwise, embodiments of the invention can be freely combined with each other.

In one aspect, the invention relates to a computer-implemented method for estimating the cardinality of a table obtained by joining at least a first data column (R) and a second data column each comprising attribute values, the method comprising the following steps:
providing a first density distribution function describing the frequency of the attribute values of the first data column;
providing a second density distribution function describing the frequency of the attribute values of the second data column;
providing a first information on values in the first data column based on a sample of values of the first data column,
providing a second information on values in the second data column based on a sample of values of the second data column and
estimating the cardinality of the joined table based on the first and second density distribution function and the first and second information on values.

Said features may be advantageous as it is possible to determine the cardinality of the joined table in a simple and fast way, especially if the database client has implemented some basic analytical functionality. Furthermore, the present invention can be applied iteratively. After estimating the cardinality for a particular join of two tables, i.e. the intermediate table, it is possible to calculate a density function for a table to be joined next, and to do another join estimation of this new table with the intermediate table. Therefore, it is possible to determine an optimal query execution plan based on cascaded cardinality estimations.

According to illustrative embodiments, the density distribution functions are determined based on a query-feedback based algorithm taking values obtained in prior query executions into account. The query-feedback based algorithm is using information of previous queries to determine the spread of data values within a certain data column. By using information of several previous queries, a density distribution function can be determined which is representing the spread of data values over the whole domain. For example, on the basis of information of several previous queries a polynomial can be deduced which is approximating the frequency of distinct values over the whole domain.

According to illustrative embodiments, the first and second information on values is statistical information derived out of the sample of values of the first or second data column. Statistical information according to the invention is information which is deduced out of the sample and in a further step generalized to on the whole domain of the respective column or a subset of the whole domain which is bigger than the sample of values.

According to illustrative embodiments, the statistical information is the number of distinct unique values within the respective sample of values. For example, a sample of data is chosen to determine the number of distinct unique values within the currently investigated sample. This information can be used to estimate the number of unique values within the whole domain of the respective column or a subset of the whole domain. This information has tremendous influence on the cardinality of the joined table.

According to illustrative embodiments, the cardinality of the joined table is estimated based on estimating the average number of rows per each unique value of the first and second data column and generalizing the obtained result to the whole set or a subset of attribute values contained in the respective data columns. The average number of rows per each unique value is calculated based on the density distribution functions and the number of unique values within the sampled data. For example, the extrapolation can be done by multiplying the average number of rows per each unique value with the maximum number of unique values determined for the respective samples. Therefore, the cardinality can be estimated in resource-saving manner based on the statistical information of the sampled data.

According to illustrative embodiments, the cardinality of the joined table is estimated based on calculating the number of rows obtained by joining the samples of values of the first and second data column and generalizing the obtained result to the whole set of attribute values contained in the respective data columns. In other words, the cardinality of the joined table is determined by joining the samples of the respective rows, calculating the exact number of rows of the joined table and extrapolating the resulting number to the whole domain. The main advantage of determining the cardinality that way is that this approach allows the usage of one calculation scheme for all kinds of join-operations, for example inner join, left-outer-join, right-outer-join and cross join.

According to illustrative embodiments, the first and second data column comprise a respective range of attribute values, wherein the range of attribute values is divided in sections of values and the cardinality of the joined table is estimated based on a summation of estimated numbers of rows obtained for the respective sections. In other words, a number of sub-cardinalities calculated, wherein the cardinality of the whole joined table is calculated by summing up the sub-cardinalities. The number of sections, in which the range of attribute values is sub-divided, has strong influence on the accuracy of the estimation of the cardinality of the joined table, i.e. the estimation of the number of rows of the joined table. So, for achieving a high accuracy, the number of sections is increased. In contrary, in cases where join estimation with a lower accuracy is acceptable, the number of sections can be decreased.

According to illustrative embodiments, the number of sections of values is determined based on the roots of the first and second density distribution function. When using a polynomial for approximating the density distribution functions, there may be sections, in which the polynomial has a negative value. This negative values result of errors of the polynomial approximation. To reduce the effect of negative values, the sections are preferably chosen according to the roots of the approximated density distribution functions. Thereby the integral over negative values returns a negative result which can easily eliminated. Of course, additional sections in between the roots of the density distribution functions can be chosen to increase the accuracy of estimation.

According to illustrative embodiments, the width of sections is determined based on the gradient of the first and/or second density distribution function. This is a more sophisticated way of determining the grid of sections. The main advantage of using the gradient, i.e. the stiffness of the density distribution function to determine the section grid is that regions with a high stiffness of density function are correlated with smaller sections and regions with a lower stiffness are represented by major sections. So, the grid density is adapted to the stiffness of the density distribution function.

According to illustrative embodiments, the first density distribution function is represented by a first polynomial estimating the frequency of a respective attribute value within the first data column (R) and the second density distribution function is represented by a second polynomial estimating the frequency of a respective attribute value within the second data column. The main advantage of using a polynomial is that a polynomial can be easily integrated over a certain range of values and the roots of the polynomial can be easily determined. When using a polynomial, the necessary calculations can be easily executed by the database client comprising a package of basic analytical functions.

According to illustrative embodiments, the method is iteratively applied for estimating the cardinality of a table resulting by joining at least three different data columns. Thereby the cardinality of a table being the result of multiple concatenated join operations can be derived by successively applying the method. After estimating cardinality for particular join of two tables or data columns, i.e. the intermediate table, it is possible to calculate density function for the third data column to be joined next and do another join estimation of this third data column with the intermediate table.

According to illustrative embodiments, the samples of values of the first data column and the second data column are extracted during query execution. Thereby it is possible to analyze exactly a certain period of data which we are interested in. This may be advantageous in case of big analytic queries where additional time to analyze the data is small in comparison to whole execution time.

In a further aspect the invention relates to a computer-based database system comprising:
    a database adapted to store at least a first data column (R) and a second data column (S) each comprising attribute values;
    a database client adapted to provide a first density distribution function (f(x)) describing the frequency of the attribute values of the first data column (R);

provide a second density distribution function (g(x)) describing the frequency of the attribute values of the second data column (S);

provide a first information on values in the first data column (R) based on a sample of values of the first data column (R), provide a second information on values in the second data column (S) based on a sample of values of the second data column (S) and estimate the cardinality of the joined table (T) based on the first and second density distribution function (f(x), g(x)) and the first and second information on values.

According to illustrative embodiments, the database client provides a package of analytical functions. Thereby the estimation of the cardinality can be done using a set of functions of the analytical package, for example integration routines, derivation routines etc.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for optimizing resource usage when accessing a database based on an estimation of a cardinality of a joined table (T) obtained by joining at least a first data column (R) and a second data column (S), wherein R and S each comprise attribute values, and wherein the method comprises:

receiving, by one or more processors, a first density distribution function f(x) describing a frequency of attribute values of the first data column (R);

receiving, by one or more processors, a second density distribution function (g(x)) describing a frequency of attribute values of the second data column (S);

receiving, by one or more processors, a first information on values in the first data column (R) based on a sample of values of the first data column (R);

receiving, by one or more processors, a second information on values in the second data column (S) based on a sample of values of the second data column (S);

estimating, by one or more processors, a cardinality of a joined table (T) based on the first and second density distribution functions (f(x), g(x)) and the first and second information on values;

receiving, by one or more processors, a request from a client computer for data from a database in a database server;

comparing, by one or more processors, an estimated cardinality of the joined table (T) to estimated cardinalities of other joined tables created from the database;

in response to determining that the estimated cardinality of the joined table (T) is less than any of the estimated cardinalities of the other joined tables created from the database, minimizing execution time and computer resource usage when responding to the request for data by utilizing, by one or more processors, the joined table (T) before utilizing any of the other joined tables created from the database; and generating and transmitting, by one or more processors, the joined table (T) to a requester of the request for data.

2. The method of claim 1, wherein the first and second density distribution functions (f(x), g(x)) are determined based on a query-feedback based algorithm, wherein the query-feedback based algorithm utilizes values obtained in prior queries for data from the first data column (R) and the second data column (S).

3. The method of claim 1, wherein the first and second information on values is statistical information that is derived out of a sample of values of the first and second data columns (R, S).

4. The method of claim 3, wherein the statistical information describes a quantity of distinct unique values ($u_1$, $u_2$) within a respective sample of values of the first and second data columns (R, S).

5. The method of claim 1, wherein the cardinality of the joined table (T) is estimated based on:

estimating the average number of rows per each unique value within the respective sample, and generalizing an obtained result to a whole set of attribute values contained in the respective data columns (R, S).

6. The method of claim 1, wherein the cardinality of the joined table (T) is estimated based on:

calculating a quantity of rows obtained by joining samples of values of the first and second data columns (R, S); and generalizing an obtained result to a subset of attribute values contained in respective said data columns (R, S).

7. The method of claim 1, wherein the first and second data columns (R, S) comprise a respective range of attribute values, wherein the range of attribute values is divided in sections of values, and wherein the cardinality of the joined table (T) is estimated based on a summation of estimated numbers of rows obtained for respective sections of values.

8. The method of claim 7, wherein a quantity of the sections of values is determined based on roots of the first and second density distribution functions (f(x), g(x)).

9. The method of claim 7, wherein a quantity of the sections of values is determined based on a gradient of the first and second density distribution functions (f(x), g(x)).

10. The method of claim 1, wherein the first density distribution function (f(x)) is represented by a first polynomial estimating a frequency of a respective attribute value within the first data column (R), and wherein the second density distribution function (g(x)) is represented by a second polynomial estimating a frequency of a respective attribute value within the second data column (S).

11. The method of claim 1, further comprising:

iteratively performing all steps in claim 1 to estimate the cardinality of a table by joining at least three different data columns.

12. The method of claim 1, wherein samples of values of the first data column (R) and the second data column (S) are extracted during a query execution.

13. A computer program product for optimizing resource usage when accessing a database based on an estimation of a cardinality of a joined table (T) obtained by joining at least a first data column (R) and a second data column (S), wherein R and S each comprise attribute values, the computer program product comprising a non-transitory computer readable storage medium having program code embodied therewith, the program code readable and executable by a processor to perform a method comprising:

receiving a first density distribution function f(x) describing a frequency of attribute values of the first data column (R);

receiving a second density distribution function (g(x)) describing a frequency of attribute values of the second data column (S);

receiving a first information on values in the first data column (R) based on a sample of values of the first data column (R);

receiving a second information on values in the second data column (S) based on a sample of values of the second data column (S);

estimating a cardinality of a joined table (T) based on the first and second density distribution functions (f(x), g(x)) and the first and second information on values;

receiving a request for data from a database;

comparing an estimated cardinality of the joined table (T) to estimated cardinalities of other joined tables created from the database;

in response to determining that the estimated cardinality of the joined table (T) is less than any of the estimated cardinalities of the other joined tables created from the database, minimizing execution time and computer resource usage when responding to the request for data by utilizing the joined table (T) before utilizing any of the other joined tables created from the database; and generating and transmitting the joined table (T) to a requester of the request for data.

14. The computer program product of claim 13, wherein the first and second density distribution functions (f(x), g(x)) are determined based on a query-feedback based algorithm, wherein the query-feedback based algorithm utilizes values obtained in prior queries for data from the first data column (R) and the second data column (S).

15. The computer program product of claim 13, wherein the first and second information on values is statistical information that is derived out of a sample of values of the first and second data columns (R, S).

16. The computer program product of claim 15, wherein the statistical information describes a quantity of distinct unique values ($u_1$, $u_2$) within a respective sample of values of the first and second data columns (R, S).

17. A computer system for optimizing resource usage when accessing a database based on an estimation of a cardinality of a joined table (T) obtained by joining at least a first data column (R) and a second data column (S), wherein R and S each comprise attribute values, the computer system comprising:

a processor, a computer readable memory, and a non-transitory computer readable storage medium;

first program instructions to receive a first density distribution function f(x) describing a frequency of attribute values of the first data column (R);

second program instructions to receive a second density distribution function (g(x)) describing a frequency of attribute values of the second data column (S);

third program instructions to receive a first information on values in the first data column (R) based on a sample of values of the first data column (R);

fourth program instructions to receive a second information on values in the second data column (S) based on a sample of values of the second data column (S);

fifth program instructions to estimate a cardinality of a joined table (T) based on the first and second density distribution functions (f(x), g(x)) and the first and second information on values;

sixth program instructions to receive a request from a client computer for data from a database in a database server;

seventh program instructions to compare an estimated cardinality of the joined table (T) to estimated cardinalities of other joined tables created from the database;

eighth program instructions to, in response to determining that the estimated cardinality of the joined table (T) is less than any of the estimated cardinalities of the other joined tables created from the database, minimize execution time and computer resource usage when responding to the request for data by utilizing the joined table (T) before utilizing any of the other joined tables created from the database; and ninth program instructions to generate and transmit the joined table (T) to a requester of the request for data; and wherein the first, second, third, fourth, fifth, sixth, seventh, eighth, and ninth program instructions are stored on the computer readable storage medium for execution by the processor via the computer readable memory.

18. The computer system of claim 17, wherein the first and second density distribution functions (f(x), g(x)) are determined based on a query-feedback based algorithm, wherein the query-feedback based algorithm utilizes values obtained in prior queries for data from the first data column (R) and the second data column (S).

19. The computer system of claim 17, wherein the first and second information on values is statistical information that is derived out of a sample of values of the first and second data columns (R, S).

20. The computer system of claim 17, wherein the statistical information describes a quantity of distinct unique values ($u_1$, $u_2$) within the respective sample of values of the first and second data columns (R, S).

* * * * *